(12) United States Patent  
Reiser et al.

(10) Patent No.: US 7,410,619 B2  
(45) Date of Patent: Aug. 12, 2008

(54) CATALYTIC COMBUSTORS KEEPING CONTAINED MEDIUM WARM IN RESPONSE TO HYDROSTATIC VALVE

(75) Inventors: Carl A. Reiser, Stonington, CT (US); Kazuo Saito, Glastonbury, CT (US); James Cameron, Sarasota, FL (US); Gennady Resnick, South Windsor, CT (US)

(73) Assignee: UTC Power Corporation, South Windsor, CT (US)

( * ) Notice: Subject to any disclaimer, the term of this patent is extended or adjusted under 35 U.S.C. 154(b) by 592 days.

(21) Appl. No.: 11/027,333

(22) Filed: Dec. 29, 2004

(65) Prior Publication Data

US 2006/0154190 A1    Jul. 13, 2006

(51) Int. Cl.  
*F01N 3/20*        (2006.01)  
*H01M 8/04*        (2006.01)

(52) U.S. Cl. ............................ 422/105; 429/22; 429/24; 422/190; 422/107; 431/268; 431/328; 431/329

(58) Field of Classification Search .................... 429/12, 429/13, 20, 26, 29, 22, 24; 431/268, 328, 431/329; 422/190, 105, 107  
See application file for complete search history.

(56) References Cited

U.S. PATENT DOCUMENTS 4,631,024 A * 12/1986 Shibata et al. ............... 431/268

6,797,421 B2 * 9/2004 Assarabowski et al. ....... 429/26  
6,902,838 B2 * 6/2005 Lee et al. ...................... 429/26  
6,955,861 B2 * 10/2005 Yoshizawa et al. ............ 429/26

* cited by examiner

*Primary Examiner*—N. Bhat  
(74) *Attorney, Agent, or Firm*—M. P. Williams

(57) ABSTRACT

The medium (9), such as water, of a container (10), such as a fuel cell accumulator, is kept above freezing by a hydrogen/oxygen catalytic combustor (13) fed hydrogen from a source comprising a mechanical thermostatic valve (25) in thermal communication (26) with the container (10) and connected to a hydrogen supply (28). The combustor may comprise an ejector (32) having hydrogen through its primary inlet (31) drawing air through a secondary inlet (33). The combustor may comprise a diffusion combustor having a catalyst (38) spaced from a heating surface (30) and a diffusion control plate (40) low partial pressure of oxygen at the catalyst causing diffusion through the barrier. Water vapor from combustion condenses on a surface (146) and is led by hydrophilic woven carbon paper (126) to wicking material (133), which has smaller pores than the carbon paper, which leads the water downwardly, through a disk (140) and plugs (147) to atmospheric air. The noble metal catalyst mixture includes TEFLON® to permit water generated by combustion to flow by gravity out of the catalyst.

16 Claims, 6 Drawing Sheets

CATALYTIC COMBUSTORS KEEPING CONTAINED MEDIUM WARM IN RESPONSE TO HYDROSTATIC VALVE

TECHNICAL FIELD

This invention relates to catalytic combustors, including an ejector hydrogen/oxygen combustor and a diffusion hydrogen/oxygen combustor, for warming a medium within a container, such as water in the accumulator of a fuel cell power plant, in response to a mechanical thermostatic valve which conducts hydrogen to a combustor in dependence upon the temperature of the container.

BACKGROUND ART

Fuel cell power plants include a stack of fuel cells, each cell having anode and cathode catalysts surrounding an electrolyte, such as phosphoric acid or a proton exchange, polymer electrolyte membrane. In either case, one product of the process is water, which must be removed from the cathode in order to prevent flooding. In PEM fuel cells, it is necessary to keep the anode side of the membrane from becoming dry, a condition which impedes the process of generating electricity. Therefore, water management is important.

In many applications, including stationary applications, space applications and vehicular applications, fuel cell power plants may be utilized in freezing environments, that is, where temperatures will fall below 0° C. (32° F.). When the fuel cell power plant is operating, it produces sufficient heat to maintain all of the water in the system above freezing; however, when the fuel cell power plant is inoperative at subfreezing temperatures for sufficient periods of time, water may freeze resulting in the potential for physical damage as well as causing the fuel cell power plant to be initially inoperable when startup thereof is desired.

In vehicular applications, a desirable criteria is the ability to operate the vehicle, with electricity generated by the fuel cell power plant, in less than one minute (or even less than 40 seconds) following the initial indication of startup, such as by turning of a key or other switch.

In the prior art, procedures have been devised for draining all or part of the water from water flow systems into an accumulator at shutdown, thereby to avoid mechanical damage as a result of ice formation in some or all of the components of the fuel cell stack and its related water management system. However, upon startup, especially at temperatures below −20° C. (−70° F.), melting of the ice in the accumulator and in the associated pumps, conduits and heat exchangers (if not drained) is necessary in order to provide water management and/or coolant to the fuel cell power plant before operation thereof can be sustained.

In U.S. Pat. No. 6,797,421, the fuel cell stack, the accumulator, the water pump and heat exchanger are all disposed within an insulated enclosure which is heated by a hydrogen/oxygen catalytic combustor, which is either disposed within the enclosure, or externally thereof, the heat being communicated via a small inlet duct or hood in the lower portion of the enclosure. In this known apparatus, one or more temperature sensors are disposed at various critical points within the enclosure, the temperature indicating signal(s) of which are provided to a controller which in turn controls either static or intermittent flow of hydrogen through a valve to the catalytic combustor. There is no disclosure of controlling the amount of air that is provided to the combustor. The controller, of course, must be provided with electrical power throughout the time that the fuel cell power plant is inoperative at subfreezing temperatures, the source of such power not being disclosed. The temperature of the catalytic combustor therein is set to operate between 93° C. (200° F.) and 370° C. (700° F.), which causes inefficient operation of the combustor.

In U.S. 2002/0068202, it is suggested that a fuel cell power plant (referred to therein as a battery) can be operated with a minimal load, either continuously or in response to a temperature sensor, so that the electrolyte of the fuel cells remain above freezing.

There are situations other than within the framework of fuel cell power plants wherein maintaining a suitable temperature of a medium in a container is required.

DISCLOSURE OF INVENTION

Objects of the invention include: maintaining the temperature of a medium within a container above a desired temperature without the use of electricity; keeping water, in an inoperative fuel cell power plant at subfreezing temperatures, from freezing without the use of electricity; efficient catalytic combustion of hydrogen; hydrogen/oxygen combustors which operate at temperatures below 150° C. (302° F.); catalytic combustors which can operate without any electrical controls; a keep warm heater for the accumulator of a fuel cell stack which operates without electricity; and high efficiency hydrogen/oxygen catalytic combustors.

According to the invention, a medium within a container, such as water within the accumulator of a fuel cell, is maintained above freezing by combusting hydrogen from a supply which is provided in response to the temperature of the container through a mechanical thermostatic valve having a temperature responsive element in thermal communication with the container.

In accordance with the invention, a hydrogen/oxygen catalytic combustor comprises an ejector having hydrogen provided to its principal inlet and air available at its secondary inlet, the ejector outlet being provided to a hydrogen/oxygen combustion catalyst.

In further accord with the present invention, a hydrogen/catalytic combustor comprises a hydrogen/oxygen combustion catalyst which is separated from a heating surface on a first side and separated from a diffusion control plate disposed in atmospheric air on a second side, hydrogen being conducted to the first side of the catalyst. Further, the catalyst comprises a porous metal substrate, the interior surfaces of which are wash coated with a mixture of TEFLON and a noble metal, such as platinum, palladium and alloys thereof. The invention in one form includes an insulator surrounding the catalyst and the spaces above and below the catalyst, with the barrier extending to substantially the periphery of the insulator. Process water vapor above the catalyst is condensed on a surface having a hydrophilic mesh adjacent to it leading to a wicking material, which has pores smaller than the pores of the mesh, the wicking material conducting the condensed process water downwardly to atmospheric air. The invention includes a metal screen to assist in distributing the hydrogen to the catalyst. The catalyst may comprise a hollow cylinder with the hydrogen inlet conduit and the wicking material passing through the center thereof.

Other objects, features and advantages of the present invention will become more apparent in the light of the following detailed description of exemplary embodiments thereof, as illustrated in the accompanying drawing.

MODE(S) FOR CARRYING OUT THE INVENTION

Figure 1:
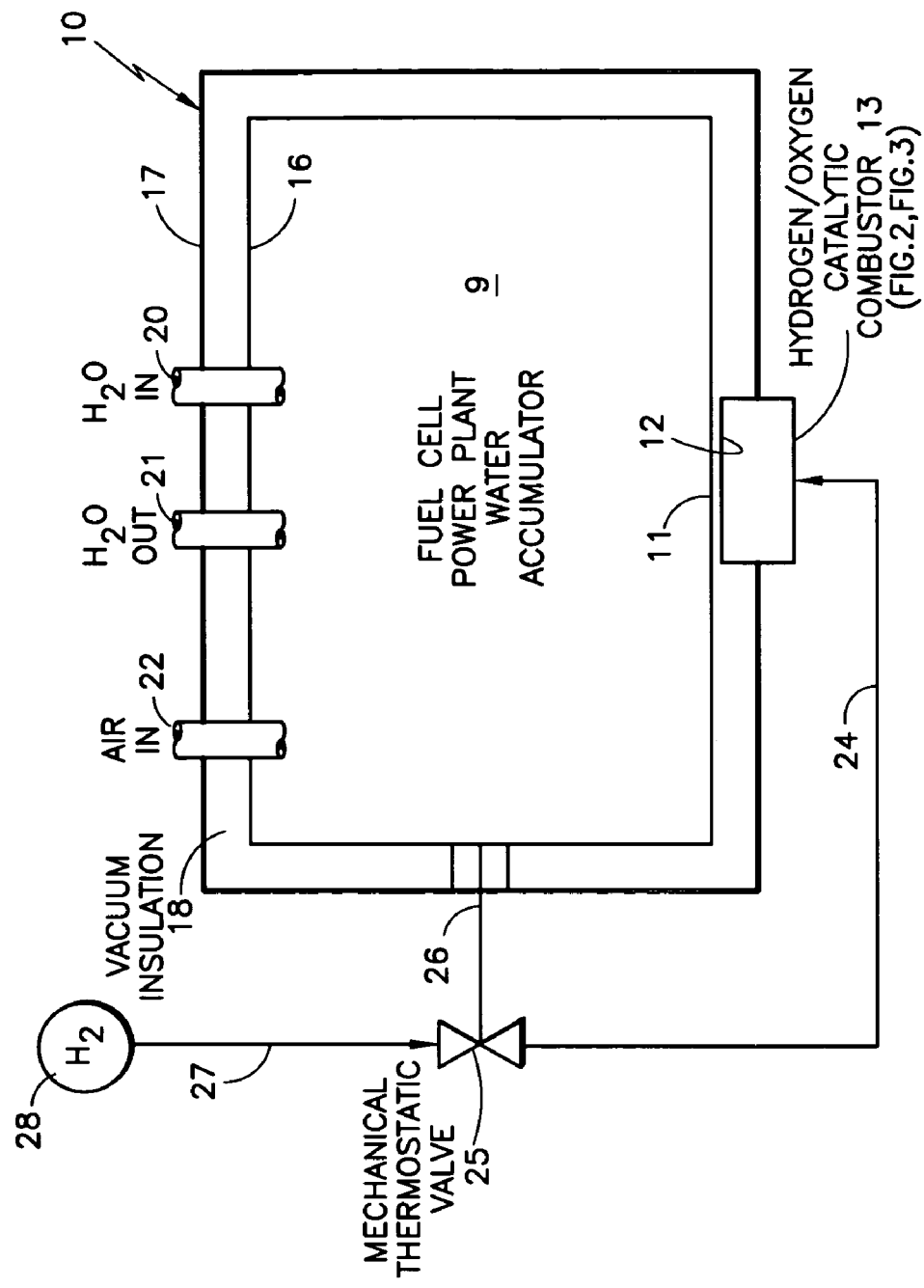
FIG. 1 is a stylized, simplified schematic illustration of an embodiment of the invention.

Referring to FIG. 1, a medium 9 within a container 10 is heated through a heatable surface 11 which is in thermal communication with a heating surface 12 of a hydrogen/oxygen catalytic combustor 13. The accumulator 10 may comprise a Dewar having inner and outer walls 16, 17 with vacuum 18 therebetween. The accumulator may have conventional water inlet 20 and outlet 21 and an air inlet 22.

The combustor 13 is provided with hydrogen over a conduit 24 from a source 25 which comprises a mechanical thermostatic valve, in thermal communication 26 with the container 10, the valve being connected by a conduit 27 to a supply of hydrogen under pressure 28. The hydrogen supply 28 may comprise the source of fuel reactant gas for a fuel cell power plant. The hydrogen may be substantially pure, or contained within a hydrogen-rich reformate or other gas.

The valve 25 is set so that it will become open if the accumulator 10 falls below a first temperature, and will close whenever the accumulator 10 reaches a second temperature, higher than the first temperature. Whenever hydrogen is passed through the valve 25, it will automatically react with available oxygen within the combustor 13, thus providing heat through the surfaces 11, 12 to the accumulator 10.

Figure 2:
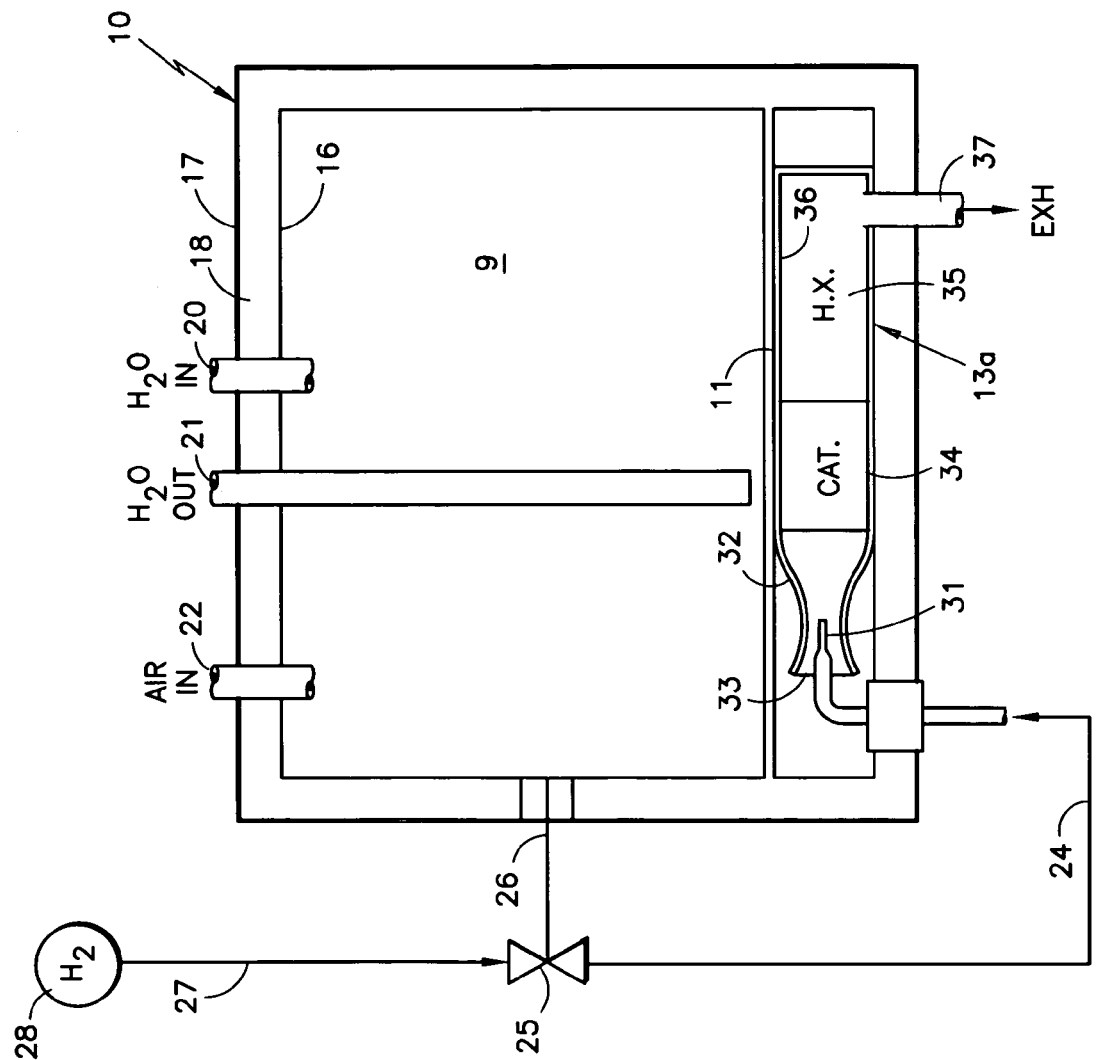
FIG. 2 is a simplified, stylized illustration of the invention employing a hydrogen/oxygen ejector catalytic combustor according to the invention.

In FIG. 2, the combustor 13a comprises an ejector-type, hydrogen/oxygen catalytic combustor. Hydrogen from the conduit 24 is fed through a fuel inlet 28 to the primary inlet 31 of an ejector 32, the secondary inlet 33 of which receives oxygen through a passage 29. The outlet of the ejector is applied to a hydrogen/oxygen catalyst 34, which may include platinum, palladium, alloys thereof or other suitable noble metals. A space downstream of the catalyst 34 comprises a heat exchanger 35, having a heating surface 36 which is in thermal communication with the heatable surface 11 of the accumulator 10. The moisture and any unconsumed gases are vented through an exhaust 37.

Figure 3:
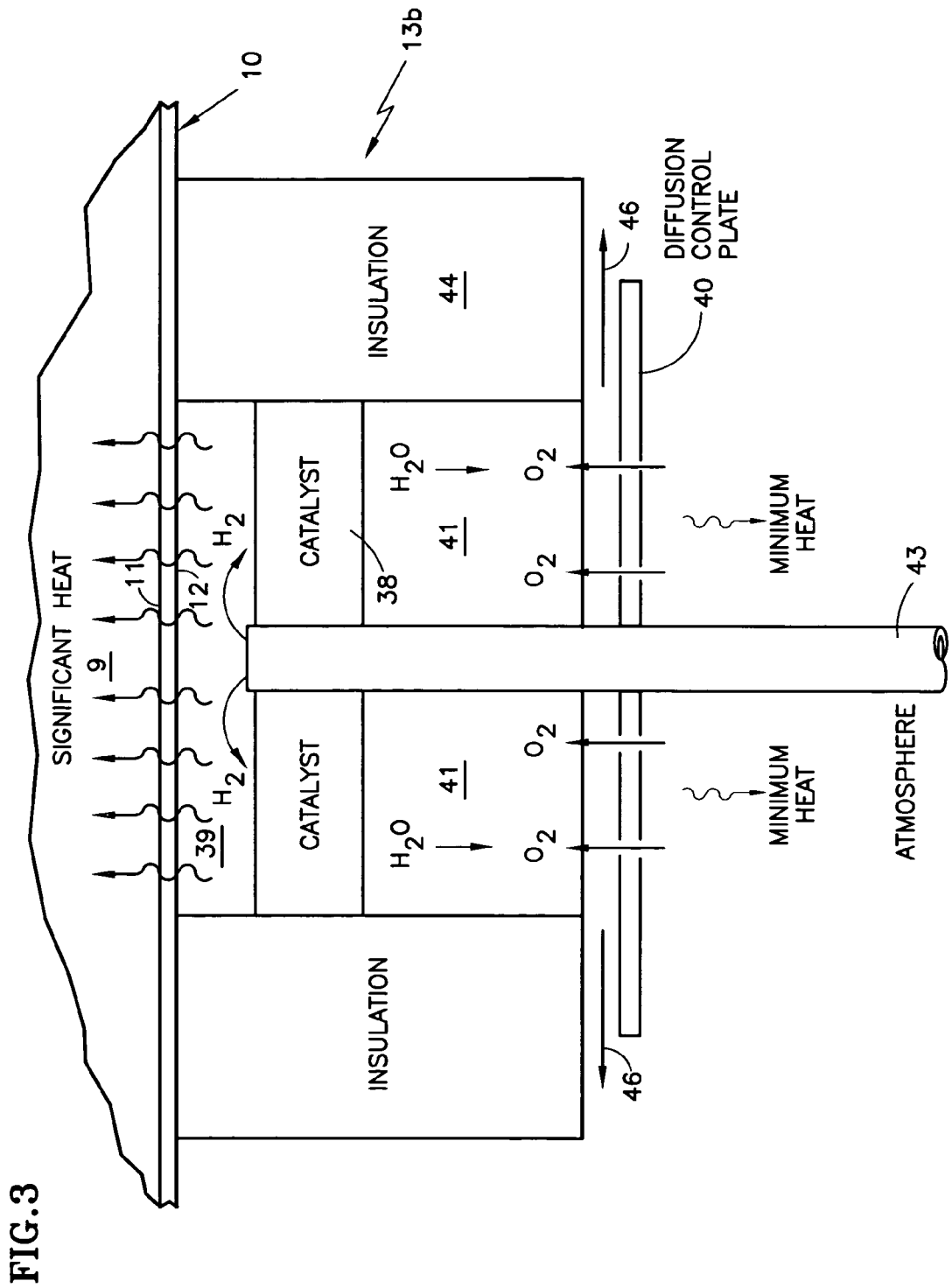
FIG. 3 is a simplified, stylized illustration of a simple embodiment of a low temperature diffusion type hydrogen/oxygen catalytic combustor according to the invention.

Referring to FIG. 3, a low temperature, diffusion-type combustor 13b comprises, in the disclosed embodiment, a hollow, cylindrical hydrogen/oxygen catalyst 38 which is separated from the heating surface 12 thereof by a space 39, and a diffusion control plate 40 which is separated from a second side of the catalyst 38 by a space 41. The diffusion control plate 40 acts as a heat barrier as well, resisting the flow of heat downwardly out of the combustor 13b.

Hydrogen is supplied above the catalyst to the space 39 by a pipe 43. Hydrogen will combust with any oxygen in the catalyst, causing the partial pressure of oxygen to be reduced, whereby oxygen will diffuse through the diffusion control plate 40 (which may typically comprise a sheet of plastic with holes in it, or some similar barrier). Thus, because of the diffusion control plate 40, substantially only oxygen diffuses into the space 41, rather than having air flowing into the space, which is mainly nitrogen. This is therefore referred to as a diffusion combustor.

In a specific embodiment herein, insulation 44 surrounds the catalyst, and the diffusion control plate 40 extends outwardly past the space 41 across a substantial portion of the insulation 44, or it may extend across all of the insulation 44. The reaction products of the catalytic burn of hydrogen with oxygen are heat and water. The ambient temperature on the underside of the barrier is presumed to be below freezing. To prevent ice and frost buildup around the bottom of the burner, some water that forms in the catalyst can mix with air that leaks through the diffusion control plate 40, forming a stream of warm moist air as indicated by the arrows 46, which prevents the product water from freezing on or below the diffusion control plate 40. The partial pressure of steam in the stream 46 is low, which minimizes frost formation surrounding the burner 13b.

Figure 4:
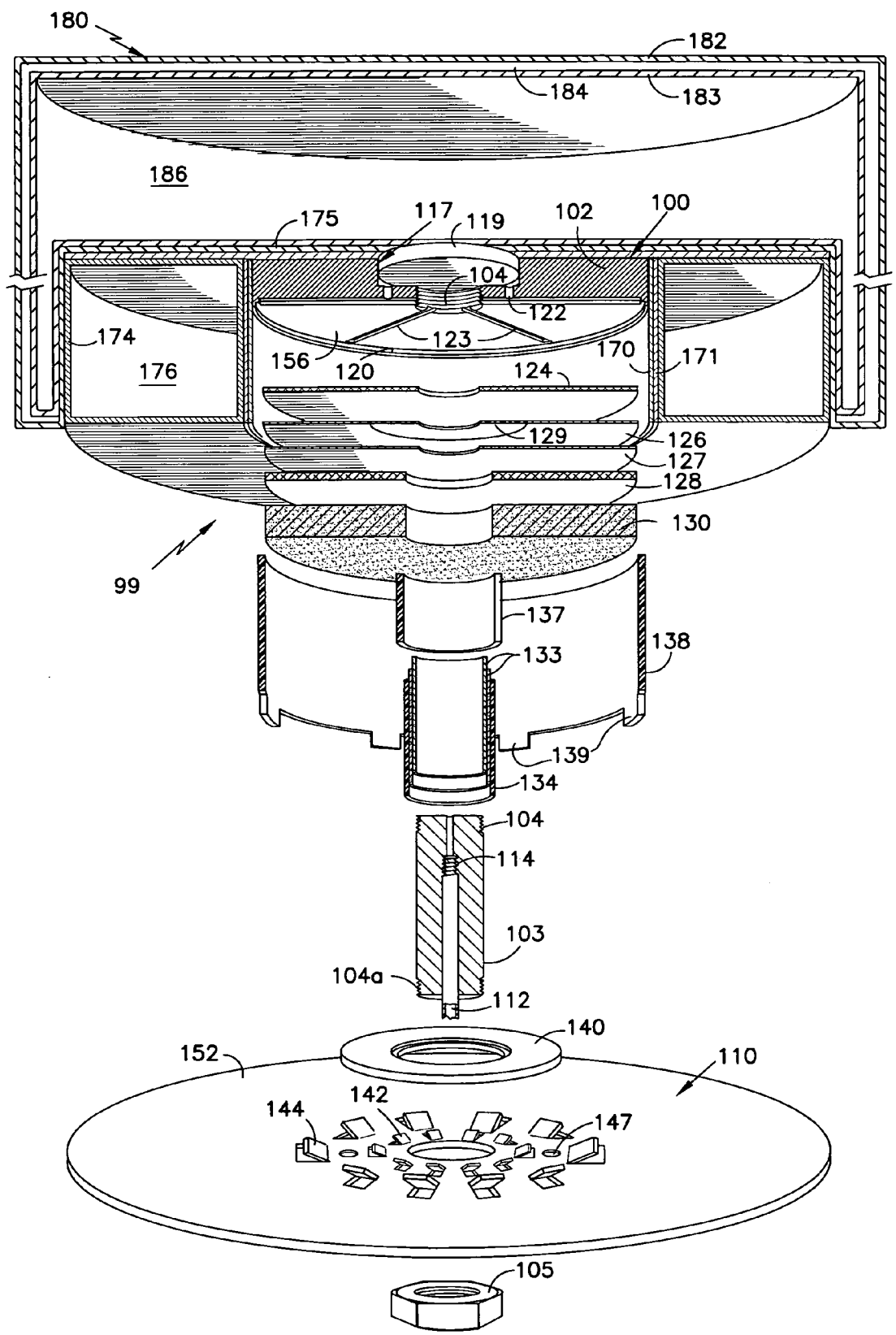
FIG. 4 is a partially broken away, partially sectioned partially exploded view of a diffusion catalyst with a container to be heated thereby.
Figure 5:
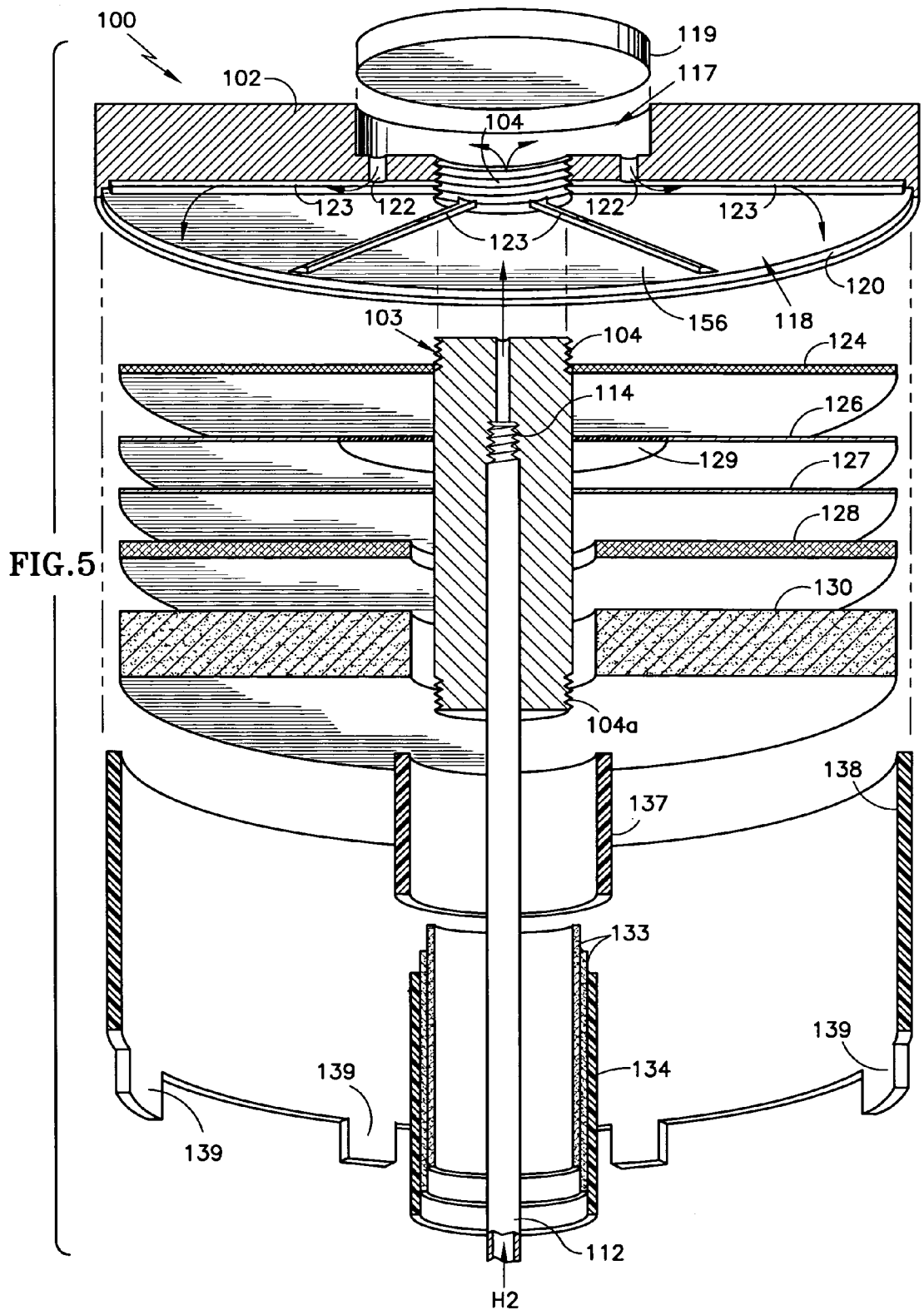
FIG. 5 is a sectioned exploded view of the upper portion of a diffusion catalyst according to one embodiment of the invention.
Figure 6:
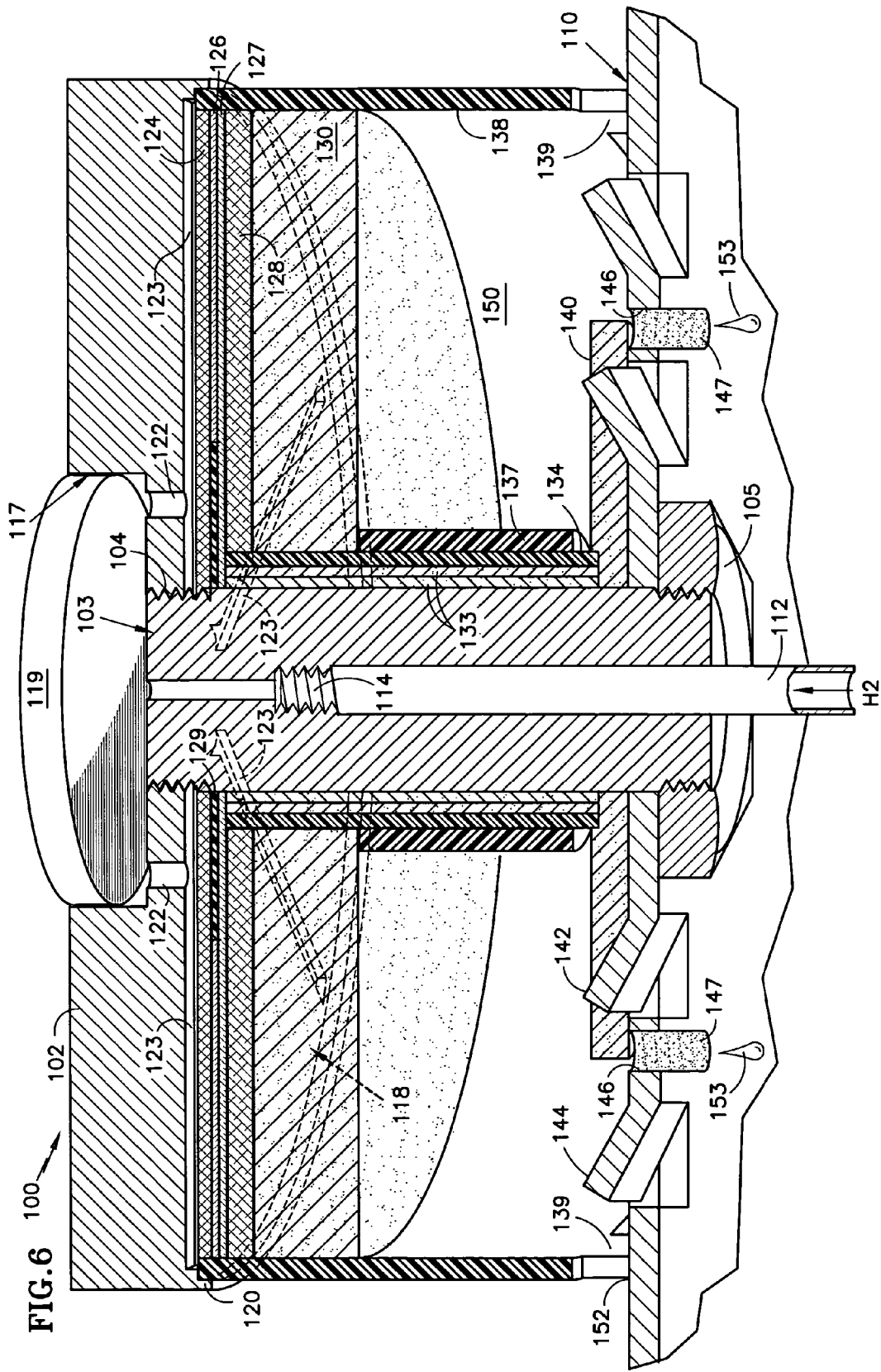
FIG. 6 is a sectioned side elevation view, partially broken away, of a diffusion catalyst according to the embodiment of FIG. 5.

A specific example of the diffusion heater of FIG. 3 is illustrated in FIGS. 4-6. FIG. 4 is a partially broken away, partially exploded dual-perspective view of an exemplary embodiment of a diffusion combustor according to the invention. The assembly 99 is round with an upper part 100, and is assembled with a stainless steel machined piece 102 at the top, into which a hollow-centered bolt 103 is secured by threads 104. The bottom of the bolt has threads 104a with which a nut 105 engages. A louvered plate 110 has a diameter twice or more the diameter of the stainless piece 102, the assembly 99 being held together by the bolt and nut between the louver plate 110 and the stainless piece 102.

A hydrogen (H2) feed pipe 112 extends from a tank (elsewhere, not shown) about ¾ of the way up through the hole in the bolt 103, where there are threads 114 to engage the end of the hydrogen feed pipe 112 to the inside of the bolt 103.

Referring to FIG. 5, the piece 102 has a central bore 117 on the top, and a very large counter bore 118 which leaves a lip 120 on the bottom. Six holes 122 are drilled through the bottom of the bore 117 and there is a radially extending groove 123 for each hole. The hydrogen then will flow up through the bolt into the bore 117 down through the holes 122 outwardly through the grooves 123 and then into a stainless steel screen 124 that extends throughout the bore 118.

Referring to FIG. 5, below the screen 124 there are two layers of hydrophilic, carbon paper 126, 127. Below that, there is a TEFLON® screen 128. The TEFLON screen 128 is just above a porous stainless steel substrate 130 with an admixture of TEFLON and either platinum or palladium, or an alloy of either of them, there being about 2.0 grams per liter of platinum/palladium, and about 0.4 g/l of Teflon. This makes the catalyst 130 hydrophobic so that any moisture that does form in the catalyst will not be entrained thereby, but will pass downwardly by means of gravity, to avoid flooding.

The upper sheet of carbon paper 126 is impregnated with KYNAR® (plastic) 129 to densify it for a short distance surrounding the bolt 103. This is to prevent the hydrogen from flowing directly downwardly, and to help deflect the hydrogen outwardly (see flow arrows on FIG. 5). Surrounding the pipe 103 is a wicking material, such as fibrous paper material similar to paper towels, and a plastic pipe 134 surrounding the wicking material 133 to provide support therefor. There is also a plastic pipe 137 that supports the inner portion of the catalyst 130.

Referring to FIG. 6, the wicking material 133 sets into a recess within a disk 140 of wicking material which extends out past a first ring of louvers 142 in the louvered plate 110. Portions of the wicking disk 140 which interfere with the louvers can either be removed, or pushed upwardly out of the way, in a conventional fashion. In FIGS. 4 and 6, the louvered plate 110 has a second ring of louvers 144 outward of the first ring of louvers 142, and there are two diametrically opposite holes 146 that have plugs 147 of wicking material extending therethrough.

The louvered plate 110 is separated from the remaining part of the structure, such as by on the order of 4 mm (0.16 inches) to promote a flow of warm moisture (water vapor), which prevents ice from forming that could otherwise block the louvers.

Referring to FIG. 4, the upper part 100 of the device 99 is wrapped in reflecting film such as aluminum adhesive tape, to form a hydrogen barrier. The upper part 100 of the device is surrounded by a square cross section toroid of vacuum insulation 176, formed by thin wall stainless steel 174, which is shown independent of the bottom of the accumulator comprising thin wall stainless steel 175.

FIG. 4 schematically illustrates an accumulator formed of a liquified gas dewar 180; that is, inner and outer thin stainless steel walls 182, 183, the space 184 between which is evacuated. However, the walls 182, 183 converge above the heater 99 so that heat can readily be transmitted from the piece 102 into the interior 186 of the accumulator 180, which in this example contains water.

In operation, when hydrogen is supplied to the pipe 112, it flows as shown by arrows in FIG. 5, downwardly into the catalyst 130. There is no air flow, but the partial pressure of oxygen is greater below the louvered plate 110 (which is atmospheric air) than is the partial pressure of oxygen inside the space 150 between the louvered plate 110 and the catalyst 130, due to consumption of oxygen in the catalyst 130. Therefore, oxygen diffuses through the louvers 142, 144 and the space 150 to the catalyst, for combustion with hydrogen at the catalyst.

As is known, the products of catalytic combustion of hydrogen and oxygen are heat and water. In this device, various measures are taken to cause the heat to flow upwardly into, for example, a water accumulator portion of a fuel cell power plant, but it could be some other device. The top surface 152 of the louver plate 110 is coated with heat reflecting material, such as chromium or aluminum, so as to minimize the flow of heat downwardly to atmosphere below the louvered plate 110.

Water condenses on the bottom surface 156 of the stainless steel piece 102, then flows through the stainless steel screen 124. The condensed water then readily flows through the two sheets of hydrophilic carbon paper 126, 127. Because the pore size of the carbon paper 126, 127 is larger than the pore size of the wicking material 133, the water is thereby sucked into the wicking material 133 where gravity pulls it downwardly to the disk of wicking material 140. The water then flows through the disk 140 to the plugs of wicking material 147 where gravity causes the water to form droplets 153 which fall into the environment.

The TEFLON screen 128 provides a thermal barrier to allow the catalyst to achieve an optimum temperature for greatest efficiency, which is about 80° C. (175 °F). If heat is allowed to transfer too rapidly into whatever the device 99 is heating (such as a fuel cell power plant accumulator 180), then the temperature in the catalyst will decrease and the process will be less efficient.

The diffusion rate of oxygen is controlled by the openness of the louvers (the flow path through the louvers) and the distance between the louver plate 110 and the catalyst 130. If too much oxygen reaches the catalyst, the temperature of the catalyst will become locally too high (perhaps as high as several hundred ° C.) which reduces efficiency due to significant heat loss out of the bottom of the device. Thus, maintaining a temperature balance inside the catalyst as well as promoting heat flow upwardly, rather than downwardly, are important aspects of the detailed design of the device described in FIGS. 4-6.

The aforementioned patent publication and patent are incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A system for keeping a medium in a container warm, comprising;
 a container having a heatable surface through which heat may be conducted into a medium within a container;
 a supply of hydrogen;
 a thermostatic valve having a temperature responsive member disposed in proximity with said container and operable to open in response to said temperature responsive member being below a first temperature and to close in response to said temperature responsive member being above a second temperature, said second temperature being higher than said first temperature, said valve connected to said supply to provide, when said valve is open, a source of hydrogen for combustion to heat said heatable surface; and
 a hydrogen/oxygen catalytic combustor selected from
  (a) an ejector combustor comprising—
   a chamber having a heating surface, through which heat is to be conducted to a heat utilizing apparatus;
   an ejector having an outlet, a principal inlet in fluid communication with said source of hydrogen, and a secondary inlet in fluid communication with atmospheric air;
   and a hydrogen/oxygen combustion catalyst disposed between said ejector outlet and said chamber; and
  (b) a diffusion combustor comprising:
   a hydrogen/oxygen combustion catalyst having first and second sides;
   a heating surface, through which heat is to be conducted to a heat utilizing apparatus, separated from said first side of said catalyst by a first space;
   a hydrogen conduit for conducting hydrogen from said source to said first space; and
   a diffusion control plate disposed in atmospheric air and separated from said second side of said catalyst by a second space;
 said heatable surface in contact with one of said heating surfaces, whereby hydrogen passing through said valve is catalytically combusted to heat the medium within said container.

2. A system according to claim 1 wherein:
 said container is an accumulator of a fuel cell power plant.

3. A temperature-responsive hydrogen source for a keep-warm system, comprising:
 a container having a heatable surface through which heat may be conducted into said container;
 a supply of hydrogen; and a thermostatic valve having a temperature responsive member in proximity with said container end operable to open in response to said temperature responsive member being below a first temperature and to close in response to said temperature responsive member being above a second temperature, said second temperature being higher than said first temperature, said valve connected to said supply to provide, when said valve is open, a source of hydrogen for combustion to heat said heatable surface.

4. A freeze-proof container comprising:
a source according to claim 2,
and a hydrogen/oxygen catalytic combustor for combusting hydrogen from said source to heat said heatable surface.

5. A container according to claim 4 wherein;
said thermostatic valve is in thermal contact with said container.

6. An accumulator for a fuel cell power plant comprising a container according to claim 4.

7. A hydrogen/oxygen catalytic combustor comprising:
a chamber having a heating surface, through which heat is to be conducted to a heat utilizing apparatus;
an ejector having an outlet, a principal inlet in fluid communication with said source of hydrogen, and a secondary inlet in fluid communication with atmospheric air; and
a hydrogen/oxygen combustion catalyst disposed between said ejector outlet and said chamber.

8. A hydrogen/oxygen catalytic combustor, comprising;
a hydrogen/oxygen combustion catalyst having first and second sides;
a heating surface, through which heat is to be conducted to a heat utilizing apparatus, separated from said first side of said catalyst by a first space;
a hydrogen conduit for conducting hydrogen from said source to said first space; and
a diffusion control plate disposed in atmospheric air and separated from said second side of said catalyst by a second space.

9. A combustor according to claim 8 wherein said catalyst comprises:

a porous metal substrate, the interior surfaces of which are washcoated with a mixture of TEFLON® and a noble metal.

10. A combustor according to claim 9 wherein:
said noble metal is selected from platinum, palladium and alloys of platinum and/or palladium.

11. A combustor according to claim 8 further comprising:
an insulator surrounding said catalyst, said first space and said second space; and wherein:
said diffusion control plate extends beyond said second space to substantially the periphery of said insulator.

12. A combustor according to claim 8 wherein:
said first space includes a metal screen.

13. A combustor according to claim 8 wherein:
said first space contains a second surface upon which moisture generated by combustion in said catalyst condenses; and further comprising:
a hydrophilic mesh having pores of a first size disposed below said second surface; and
a wicking material having pores of a second size smaller than said first size extending from said mesh to ambient below said barrier, whereby condensate from said surface is conducted to ambient.

14. A combustor according to claim 8 wherein:
said catalyst is a hollow cylinder having a central bore disposed with its axis vertical.

15. A combustor according to claim 14 wherein:
a hydrogen conduit passes through said central bore to provide hydrogen to said first space.

16. A combustor according to claim 14 wherein:
said first space contains a second surface upon which moisture generated by combustion in said catalyst condenses; and further comprising;
a hydrophilic mesh having pores of a first size disposed below said second surface; and
a wicking material having pores of a second size smaller than said first size extending through said central bore from said mesh to ambient below said diffusion control plate, whereby condensate from said surface is conducted to ambient.

* * * * *